(12) United States Patent
Goldszmidt et al.

(10) Patent No.: US 7,370,108 B1
(45) Date of Patent: May 6, 2008

(54) METHOD FOR DETERMINING BEHAVIOR OF AN INFORMATION SYSTEM TO CONTROL ITS ABILITY TO DELIVER A USER'S QUALITY OF SERVICE

(75) Inventors: Moises Goldszmidt, Foster City, CA (US); Bikash Sabata, Menlo Park, CA (US); Derek Palma, Union City, CA (US); Amitava Raha, San Jose, CA (US)

(73) Assignee: Entrust, Inc., Addison, TX (US)

( * ) Notice: Subject to any disclaimer, the term of this patent is extended or adjusted under 35 U.S.C. 154(b) by 0 days.

(21) Appl. No.: 11/527,101

(22) Filed: Sep. 25, 2006

Related U.S. Application Data

(63) Continuation of application No. 09/797,006, filed on Feb. 28, 2001, now Pat. No. 7,113,986, which is a continuation-in-part of application No. 09/770,828, filed on Jan. 26, 2001, now abandoned, which is a continuation-in-part of application No. 09/616,096, filed on Jul. 14, 2000, now abandoned, and a continuation-in-part of application No. 09/615,677, filed on Jul. 14, 2000, now abandoned, and a continuation-in-part of application No. 09/615,962, filed on Jul. 14, 2000, now abandoned, and a continuation-in-part of application No. 09/616,488, filed on Jul. 14, 2000, now abandoned, and a continuation-in-part of application No. 09/616,384, filed on Jul. 14, 2000, now abandoned, and a continuation-in-part of application No. 09/615,887, filed on Jul. 14, 2000, now abandoned, and a continuation-in-part of application No. 09/615,678, filed on Jul. 17, 2000, now abandoned, and a continuation-in-part of application No. 09/615,886, filed on Jul. 14, 2000, now abandoned, and a continuation-in-part of application No. 09/615,892, filed on Jul. 14, 2000, now abandoned.

(51) Int. Cl.
*G06F 15/173* (2006.01)
*G06F 15/16* (2006.01)

(52) U.S. Cl. ...................... 709/226; 709/232
(58) Field of Classification Search ................ 709/223, 709/224, 226, 232, 233–5, 241
See application file for complete search history.

(56) References Cited

U.S. PATENT DOCUMENTS

| | | | |
|---|---|---|---|
| 5,886,907 | A | 3/1999 | Abu-Amara et al. |
| 6,006,269 | A | 12/1999 | Phaal |
| 6,360,270 | B1 | 3/2002 | Cherkasova et al. |
| 6,377,996 | B1 | 4/2002 | Lumelsky et al. |
| 6,529,950 | B1 | 3/2003 | Lumelsky et al. |
| 6,631,122 | B1 | 10/2003 | Arunachalam et al. |
| 6,728,748 | B1 | 4/2004 | Mangipudi et al. |
| 2002/0152305 | A1 | 10/2002 | Jackson |

*Primary Examiner*—Paul H. Kang
(74) *Attorney, Agent, or Firm*—Hickman Palermo Truong & Becker LLP

(57) ABSTRACT

A method of determining behavior of an information system application is provided. The information system application's behavior for user content requests and load conditions is determined as is a user's quality of service objectives. The information system application's capacity allocation is then prioritized. Changes in the information system application's behavior are detected. The behavior of the information system applications is then updated in response to detecting changes that affect the user's quality of service objectives.

54 Claims, 10 Drawing Sheets

METHOD FOR DETERMINING BEHAVIOR OF AN INFORMATION SYSTEM TO CONTROL ITS ABILITY TO DELIVER A USER'S QUALITY OF SERVICE

RELATED APPLICATIONS

This application is a continuation of U.S. Ser. No. 09/797,006, filed on Feb. 28, 2001, now U.S. Pat. No. 7,113,986, which is a continuation-in-part of U.S. Ser. No. 09/770,828, filed on Jan. 26, 2001, which is a continuation-in-part of U.S. Ser. Nos. 09/616,096, 09/615,677, 09/615,962, 09/616,488, 09/616,384, 09/615,887, 09/615,678, 09/615,886, 09/615,892, all filed on Jul. 14, 2000, all now abandoned, all of which are incorporated herein by reference.

FIELD OF THE INVENTION

This invention relates generally to an approach directed to dynamically control of an information system, and more particularly to a technique that delivers consistent and predictable service quality for multiple requests in an information system.

BACKGROUND

Several protocols exist in which one computer (a "host") receives and processes requests from a number of other computers ("clients"). For example, in applications involving the world-wide web, a server can receive and process many concurrent requests from different users on the internet. In this example, the server would be the host while each user device would be a client.

Requests can usually be grouped into sessions, with each session each having one or more related requests. For example, a multiple-request session could consist of a request requesting information over the world wide web, and an associated response. Alternatively, a multiple-request session could consist of a commercial transaction, with related requests respectively used to locate a web site for a precise product, submit an order or billing and shipping information, and convey a confirmation of sale to a particular client. Whether a host is to process just a single request or a series of related requests, is usually important to quickly; accurately and completely service each request and each session.

The term "quality of service" refers a host's ability to provide quick and consistent responses to a request, complete a session and consistency in doing so. As a particular host becomes more popular, and due to that popularity receives more requests, the host's processing resources can become stretched. For example, due to heavy traffic, a host may not be able to respond to a request at all, or the host may not provide a timely response (which can cause a client to "time-out" and generate an error). Poor quality of service can have significant consequences, as users may become frustrated and simply give up trying to reach a particular host, or the sponsor of the host may lose sales or fail to communicate needed information to any or all clients.

Two techniques are generally used to alleviate quality of service problems. First, more processing capacity can be added to the host, typically by either replacing the host with another, more powerful computer or by providing multiple computers in parallel and delegating new requests to different ones of the multiple computers. While this first technique presents an effective way of reducing some quality of service problems, it is not always practical. For example, sometimes, due to inadequate planning, budgetary constraints or space constraints, additional processing capacity cannot be added. If demand for a host is not properly forecast, there may be a long lead time before additional processing capacity can be purchased and implemented. Additionally, the processing power may be in the placed inefficiently in the information system.

A second technique calls for applying "admission control," where only a certain number of client requests are processed ("admitted") and the remainder are refused; of the requests which are in fact admitted, all are ideally handled in an expedient manner without degradation of quality of service as to those admitted requests. An advantage of this technique is that admission control can be implemented in software, thus facilitating quick, inexpensive use with little advance notice. Unfortunately, typical admission control mechanisms operate by admitting requests on a request-by-request basis, and so, these typical admission control requests do not provide an adequate solution for multiple-request sessions. Also, the requests which are not admitted to the host are generally not handled at all, such that a client is not informed that the request has been refused or the client, if informed, is simply asked to "try again later." Typically, a refused client must try repeatedly to obtain service with no guarantee that future requests will be processed. For these reasons and others, techniques generally used to alleviate quality of service problems are not always successful. U.S. Pat. No. 6,006,269, incorporated herein by reference, discloses an admission control system having an admission control gateway, a deferral manager and a scheduler. When the admission control gateway receives a request that calls for a new client session, the gateway determines whether a processing threshold has been reached; if the threshold has been reached or surpassed, the request is passed to the deferral manager to formulate a response to the particular client. The scheduler is checked to determine a time when the host can expect to have processing resources available, and the deferral manager then formulates a time indication which tells the client when the client can expect to gain admission to the host.

A need exists for an admission control system having an improved ability to alleviate quality of service problems. In particular, a need exists for an admission control system which responds to all requests, whether or not those requests are actually admitted. Ideally, such system would operate by admitting entire sessions, not just individual requests, such that requests relating to a session in-progress are generally admitted. With a system of this type, admission on control would at least provide a reliable means of finishing each session with high quality of service. Finally, a need exists for a system that provides some committed level of service to all clients, including those which may have been initially refused admission.

SUMMARY

Accordingly, an object of the present invention is to provide a control method and apparatus with an improved ability to alleviate quality of service problems.

Another object of the present invention is to provide a control method and apparatus that responds to all requests whether or not those requests are actually admitted.

Yet another object of the present invention is to provide a control method and apparatus that provides some level of service to all clients, including those which have been refused admission.

An object of the present invention is to provide a method and apparatus that enables e-businesses to deliver predictable and consistent service levels when there are sudden and unpredicted changes in traffic and infrastructure.

Still another object of the present invention is to provide a method and apparatus that enables e-businesses to deliver multiple differentiated service levels that are predictable and consistent when there are changes in traffic and infrastructure.

Yet another object of the present invention is to provide a method and apparatus that enables e-businesses to create different customer classes and service levels and serve them in terms of priority when there are changes in traffic and infrastructure.

A further object of the present invention is to provide a method and apparatus that minimizes server and site meltdown under high level traffic conditions.

Yet a further object of the present invention is to provide a method and apparatus that proactively and precisely plans and provisions web site infrastructures for future growth and for under certain conditions.

These and other objectives of the present invention are achieved in a method of determining behavior of an information system application. The information system application's behavior for user content requests and load conditions is determined as is a user's quality of service objectives. The information system application's capacity allocation is then prioritized. Changes in the information system application's behavior are detected. The behavior of the information system applications is then updated in response to detecting changes that affect the user's quality of service objectives.

In another embodiment of the present invention, a method of determining behavior at least one software application coupled to a network information delivery system is provided. The software application's behavior for user content requests is determined. The network information delivery system's behavior as a function of user content requests and a user's quality of service objectives are determined. The network information delivery system's capacity allocation is then prioritized.

Changes in one or both of the software application and network information delivery system are detected. The behaviors of the software application and the network information delivery system are then dynamically updated in response to detecting changes that effect the user's quality of service objectives.

DETAILED DESCRIPTION OF EXAMPLE EMBODIMENTS

Figure 1:
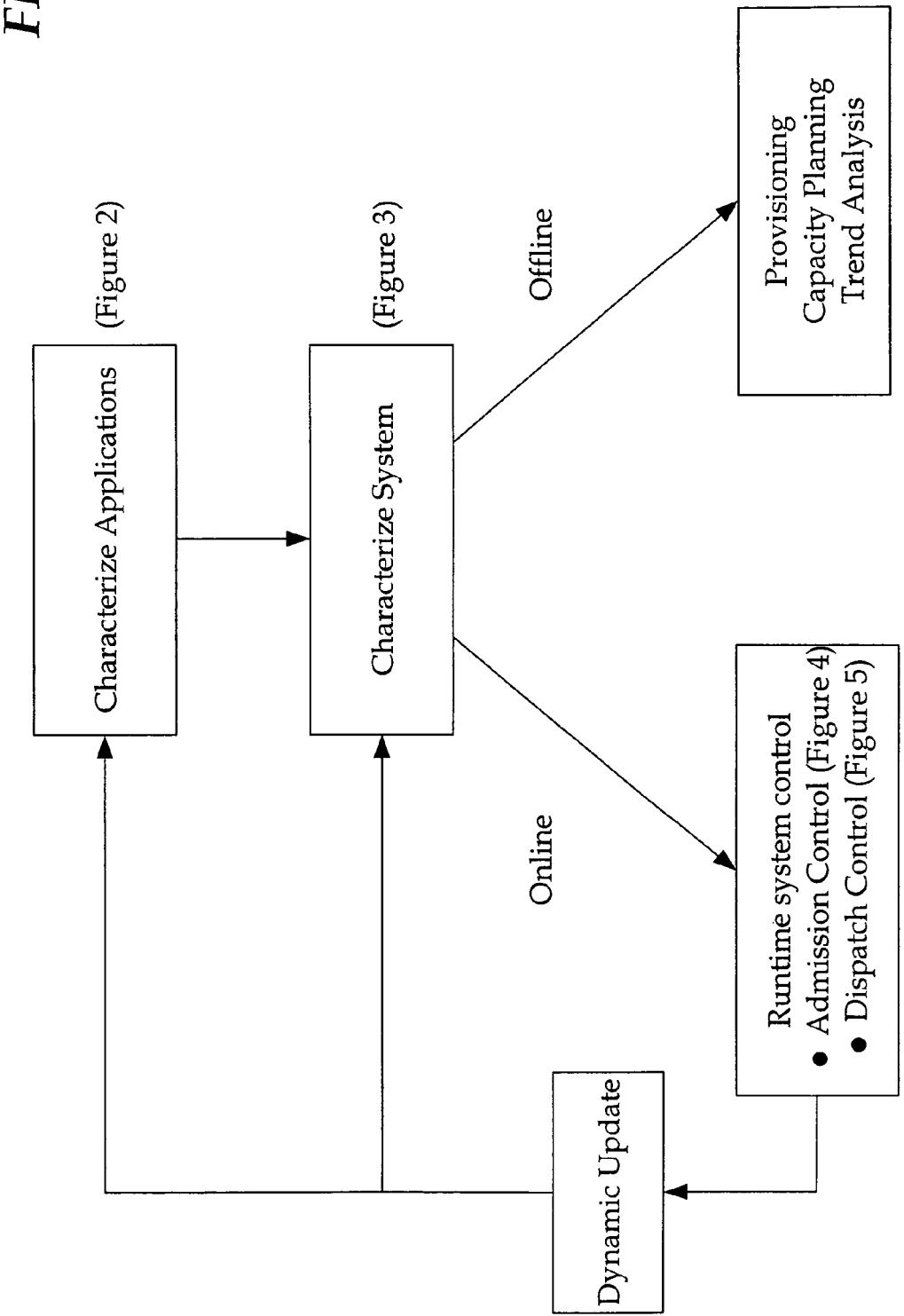
FIG. 1 is a flow chart illustrates characterization of an information system according to one embodiment of the present invention.

The present invention is a method and system that enables, (1) consistent and predictable delivery of service levels to content requests in the midst of changes to content request levels and mixes and information system infrastructure behavior based on defined business objectives, (ii) consistent and predictable delivery of multiple, differentiated service levels to different customer classes and service requests in the midst of changes to request levels and mixes and information system infrastructure behavior based on defined business objectives, (iii) absolute prevention of server or information system overload ("meltdown") in the midst of extreme and unanticipated changes in either traffic or information system infrastructure coupled with business defined alternatives on how to best deliver services to customer classes and services during these changes and (iv) the ability to proactively and precisely provision and plan for information systems infrastructure growth and service level delivery from the information systems which takes into consideration potential changes in content request levels, content request mixes, changes to the information system and changes to service levels offered.

These different customer classes include, but are not limited to, most profitable customers, most frequent customers, customers who are currently on the information system as compared to those who are about to enter the information system, first time customers, customers specifying a specific content request such as book buying verses book browsing, and the like. Examples of different service levels include but are not limited to, guaranteed fastest access to the information system, guaranteed response times from the information system, guaranteed transaction protection during heavy traffic conditions, guaranteed information system access during all conditions, and the like. Priority of serviced is determined by the manager of the information system in line with its business objectives. It will be appreciated that the present invention is not limited to the preceding.

A host processing system can be utilized to provide priority access based on multiple classes of service and deferral of certain content requests. A web page can be downloaded to a client having automatic or elective attempts to later attain access. The host processing system allocates incoming content requests to one or more processing tasks according to priority or class of service (each referred to as "priority"). Priority can be associated with each content request by an admission control and dispatching system, information contained within a content request, a client system, the server or other components of the information system, and the like.

In one embodiment, priority can be assigned to content requests upon deferral because the server is too busy to handle new sessions represented by the content requests such that when later re-submitted, the content requests are then-handled on a priority basis. In one example, deferred content requests can be specifically assigned an appointment for resubmission at a time when it is thought that the server can guarantee priority processing to the content request. Additionally, the information system may send a message to the requester, be unavailable for the content request, be unavailable for the content request for a selected period of time, queue the content request for admission to the information system, gracefully degrade a quality service compliance of sessions currently existing in the information system, gracefully degrade a quality service compliance of new sessions incoming to the information system, gracefully degrade new and existing sessions, and gracefully degrade lower priority customers as defined in the user's quality of service objectives. It will be appreciated that the handling of deferred content requests may employ various combinations of the above and that the present invention is not limited to the preceding examples which are given by way of illustration.

For purposes of this specification, "gracefully degrade" means incrementally relaxing one or more of the user's quality of service objectives including, but not limited to, response time, probability of response time, consistency of response time, number of concurrent users, number of of concurrent content requests, and the like, for various customer classes and services.

In one embodiment, the host processing system includes an admission control system that normally admits delays and/or rejects content requests from a client system to a server. If processing resources of the information system are strained, the admission control system can admit content requests based the user's quality of service objectives and priorities. Admission control software operates principally on a server within the information system.

Examples of the user's quality of service objectives include, but are not limited to, speed of content delivery for a specified time, consistency of speed of content delivery, information system response time, information system response time consistency, the number of concurrent users or content requests, and the like.

Referring now to FIG. 1, one embodiment of a method for determining the behavior of an information system application is illustrated.

As illustrated, the information system includes at least one software application, a network information delivery system as well as combinations of software applications with network information delivery systems. Examples of software applications include, but are not limited to, e-commerce and other internet-based transactions such as browsing, buying, requesting specific information or pages, and the like. Each network information delivery system has server and network components which may include, but are not limited to, one or more of the following, as well as combinations of, a web-server, application server, database server, fire wall server, secure transaction server, load balancer, web switch, network quality of service manager, network bandwidth manager, network traffic shaper, cache, content delivery system, and the like. These information system components may reside in one or more geographic locations and connected by a variety of different networking configurations and technologies.

The behavior of the information system application for content requests, volumes and mixes, and various load conditions is determined. Load conditions are the amount of consumed resources of the information system at a given point in time. Examples of consumed resources include, but are not limited to, utilization of computing resources, utilization of network bandwidth resources, utilization of database resources, and the like. The user's quality of service objectives are then ascertained for various customer classes and services. The information system's capacity allocation is then prioritized to best meet the user's quality of service objectives. On an instantaneous and on-going bases changes may be detected in the information system application and delivery system behaviors as a result of changes in content request patterns, volumes and mixes. In response to detecting changes that affect a committed or guaranteed delivery of the user's quality of service objectives, the behavior of the information system and/or application is updated periodically or dynamically in order to better meet the user's quality of service objectives.

Additionally, the information system application's behavior can change due to software or hardware revisions and changes, different traffic volumes, mixes and content requests. Changes in traffic mix may include changes in content requests, geography or user types, and software and hardware revisions or changes.

Detecting changes in the information system application may result in a determination of control techniques required by software and/or network components of the information system application in order to ensure that the user's quality of service objectives are met. Examples of detecting changes in the information system include (a) determining the amount of capacity that needs to be reserved in the information system application to ensure that the user's quality of service objectives are met, (b) updating behavior characteristics of the information system based on recent and/or historical observations of the information system application, and (c) updating behavior characteristics of the information system based on recent and historical observations of the information system application. Examples of control techniques include, but are not limited to, changing the policies or weightings of load balancers, web-switches, and/or network bandwidth managers, in order to reallocate patterns of content requests and meet the user's quality of service objectives. These control techniques may be initiated as a result of observed changes in content request volume or mix that potentially impact the user's quality of service objectives. Additionally, the control techniques may be initiated as a result of a change in the information system infrastructure such as the addition or deletion of computing or networking components as well as additions, deletions, or revisions of software applications, and other changes in the information system that can impact the user's quality of service objectives.

In an embodiment of the present invention, the behavior of at least one software application coupled to the network information delivery system is determined for various levels and patterns of user content requests. Then, the network information delivery system's behavior is determined as a function of user content requests. The user's quality of service objectives are ascertained and a capacity allocation of the network information delivery system is prioritized based on the user's quality of service objectives and priorities. Changes in the software application and/or network information delivery system are then determined. The behaviors of the software application and the network information delivery system are updated dynamically in response to detecting changes that affect the user's quality of service objectives.

The ability to characterize the software application and information system, as a function of various user content request volumes and mixes, coupled with the control techniques described above, allows the information system to deliver consistent and predictable service levels. These are delivered in the midst of unanticipated changes from the infrastructure and/or the content request side consistent with the user's quality of service objectives and priorities.

Figure 2:
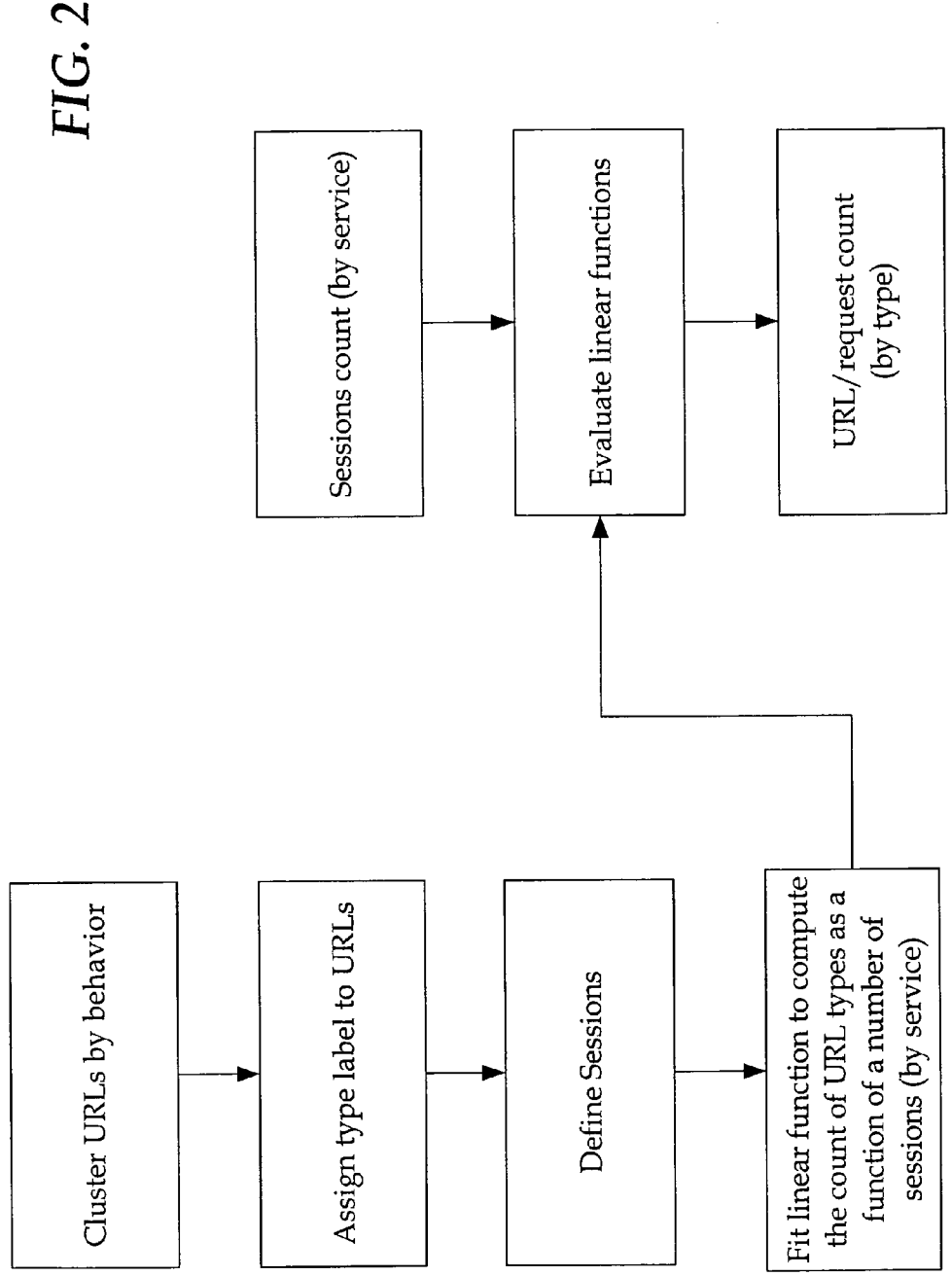
FIG. 2 is a flow chart illustrating a process for characterizing software applications by behaviors and content requests according to one embodiment of the present invention.

Referring now to FIG. 2, after the behavior of an information system is determined the software application is then characterized via a method of grouping content requests by one or more behavior labels for each content request. Sessions for various user and service types are defined. Sessions are a group of one or more content requests. The sessions are then modeled to create representative sessions. Each session is then matched with one or more representative sessions.

A representative session can be a characterization of a group of content requests in terms of common properties. Common properties are typically behavior or statistical properties. Examples of behavior properties include capacity usage, the time required to process a new content request, the amount of capacity required to process the new content request and the number of database interactions of the new content request the amount of response time required to process the new content request.

New content requests include, but are not limited to, URLs. Each session may be a group of URLs, one or more content requests, or one or more content requests from a single requester. The requester is either a human being or a machine such as another server or computer from the same or different information system.

Each session may be defined by its service type, number and type of content requests it contains, or content requests requested by a given browser. Content requests may be labeled according to the content request's behavior characteristics under a specific application, traffic, load and information system conditions.

In one embodiment of the present invention, a method of clustering content requests by one or more behavior labels is provided. Sessions are defined for various user and service types. The sessions are modeled to create representative sessions. Each session is then matched with one or more representative sessions.

In one embodiment of the present invention, a method of clustering content requests by grouping by one or more behavior labels for each content request by the user's quality of service objectives is provided.

Sessions are defined for various user and service types. The sessions are once again modeled to create representative sessions and each session is then matched with one or more representative sessions.

The present invention also provides a method of grouping content requests by one or more behaviors. Each content request is labeled by mix. Sessions are defined for various user and service types. Again, the sessions are modeled to create representative sessions and each session is matched with one or more representative sessions.

In one embodiment, content requests are grouped by one or more behaviors by labeling each content request by capacity. Sessions are then defined as before followed by modeling to create representative sessions and matching each session with one or more representative sessions.

Figure 3:
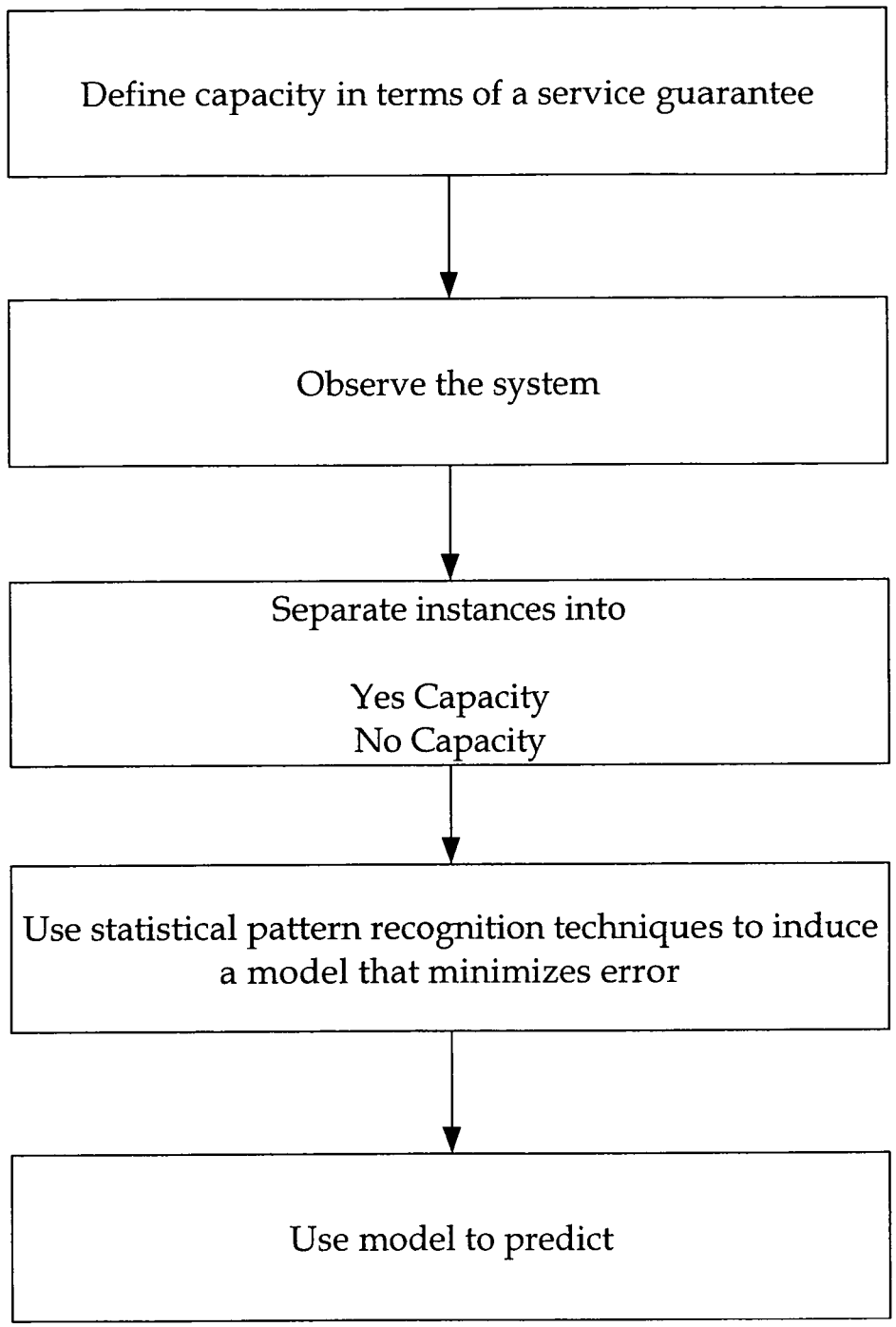
FIG. 3 is a flow chart illustrating a process for generating capacity and provisioning functions according to one embodiment of the present invention.

Referring now to FIG. 3, after the application is characterized, a capacity function and provisioning function of the information system are generated. In one embodiment, a method of defining the required information delivery system capacity, as a fuction of the user's service quality objectives, is provided. The information delivery system monitors behavior to understand under what conditions the user's service quality objectives are met or not met. The conditions in which the user's service quality objectives are met or not met are captured. Statistical techniques are applied to the conditions captured. Examples of statistical techniques include but are not limited to regression analysis, Baysian modeling, and the like. A model is then created that describes the conditions in which the user's service quality objectives are met or not met.

Creation of the model may take various forms such as analytical techniques to minimize an error associated with the model, statistical techniques to minimize an error associated with the model, and probability techniques to minimize an error associated with the model. Additionally, the model may be used to predict a state of the information system required to meet selected user quality of service objectives.

Figure 4A:
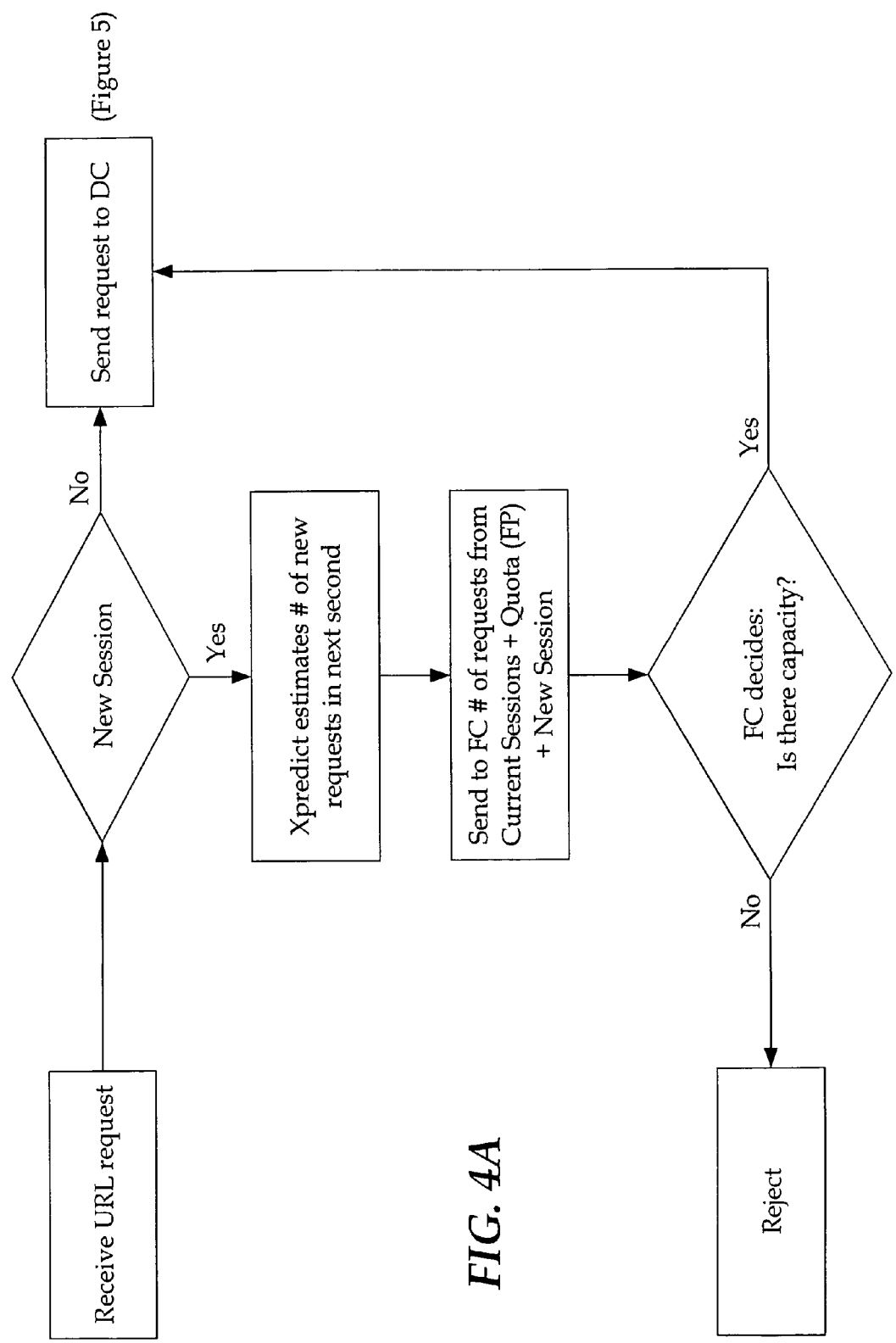
FIG. 4A is a flow chart illustrating an admission control methodology for admitting new content requests to an information system according to one embodiment of the present invention.

A flow chart of the admission control methodology of the present invention is illustrated in FIG. 4A. The present invention also provides methods to determine when and how to admit a content request to the information system. These methods may be predictive, reactive, or a combination of the two. The user's quality of service objectives and a content request are received at the information system. A determination is made to ascertain if the content request is for an existing new session. The content request is sent to a dispatch control ftmction when the content request is for an existing session.

After the user's quality of service objectives and new content request are received at the information system a determination is made to ascertain if the content request is for an existing session or a new session. When the content request is not part of an existing session, future content requests expected in a predetermined time for the information system are predicted. New content requests expected in the predetermined time can then be aggregated with existing content requests currently being processed by the information system to create an aggregated content capacity request. New content requests and current content requests are then processed to determine if the information system can process the aggregated content capacity request in compliance with the user's quality of service objectives. This processing is based on behavior of the information system for user content requests, volumes and mixes, and various load conditions as disclosed in FIG. 1. The content request is either accepted or rejected. If accepted, the content request is then sent to dispatch control as described in FIGS. 5A and 5B hereafter. When the content request is rejected, it is processed according to a user defined rejection rule.

The user defined rejection rule can include, sending a message to the requester, making the information system unavailable for the content request, making the information system unavailable for the content request for a selected period of time, queuing the content request for admission to the information system, gracefully degrading a quality service compliance of sessions currently existing in the information system gracefully degrading a quality service compliance of new sessions incoming to the information system, gracefully degrading new and existing sessions and gracefully degrading lower priority customers as defined in the user's quality of service objectives.

Figure 4B:
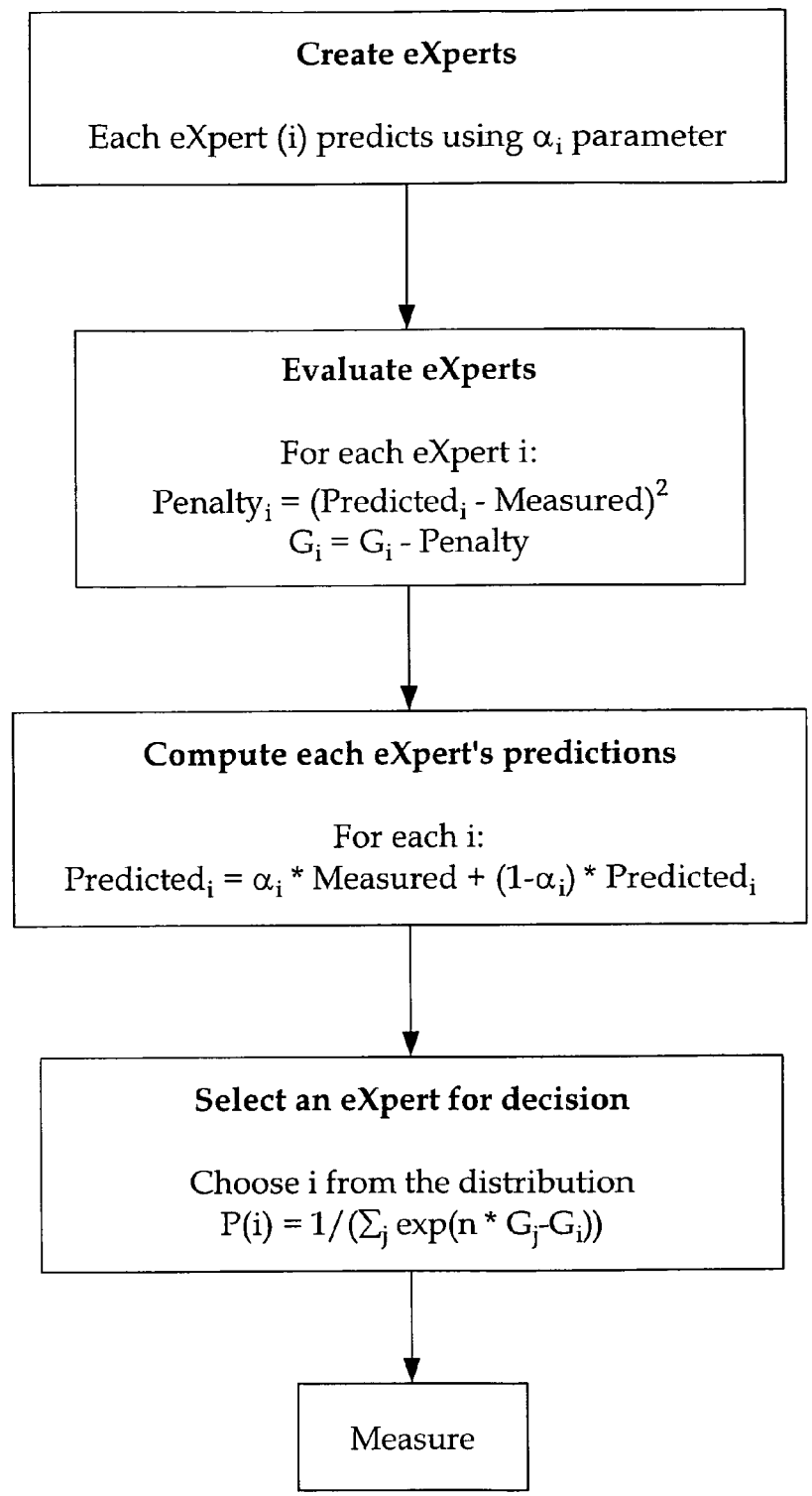
FIG. 4B is a flow chart illustrating a predictive admission control methodology for admitting new content requests to an information system according to one embodiment of the present invention.

FIG. 4B illustrates a method for determining a number of future content requests that will arrive at the information delivery system for a predetermined future period of time. A number of models are created that predict the number of future content requests. A determination is made for each of its respective predictions for the pre-determined future period of time, A model is then selected which has the least error, or lowest penalty function, associated with its prediction to create a best model predictive assessment of the next interval's number of content requests. The number of current content requests is added to the predicted future content requests to create an aggregate total number of content requests. The aggregated total number of content requests is then sent to a capacity function to determine if at that instant the information system has enough available capacity to service the aggregated number of content requests in compliance with the user's quality of service objectives.

A penalty function is a method to determine the accuracy of a model that predicts the number of content requests. An example of a suitable function useful with the present invention is achieved by means of actual observation of the number of content requests during a selected time period which are then compared to the predicted value. This assessment may be performed at any instant in time or over a period of time in order to construct a selection function which determines the predictive models that are the most accurate. Such assessments are dynamic and changed with modifications of the user's quality of service objectives or changes to the information system. The selection function can include construction of a probability distribution over a set of predictive models. The construction of the probability distribution then determines the accuracy of the models and the stochastic selection of the models according to this distribution. An example of a probability distribution is:

$$P[j] = 1 \Big/ \left( \sum_{i=1}^{n} e^{n(gain_i - gain_j)} \right)$$

where n is a free parameter called "learning rate", $gain_i$ is an accumulated penalty of algorithm i, and P[j] is the probability for algorithm j. Additionally, each model can be of the form (recursive):

Prediction(i)=alpha*observation+(1-alpha)*Prediction(i-1) for different values of alpha.

Figure 4C:
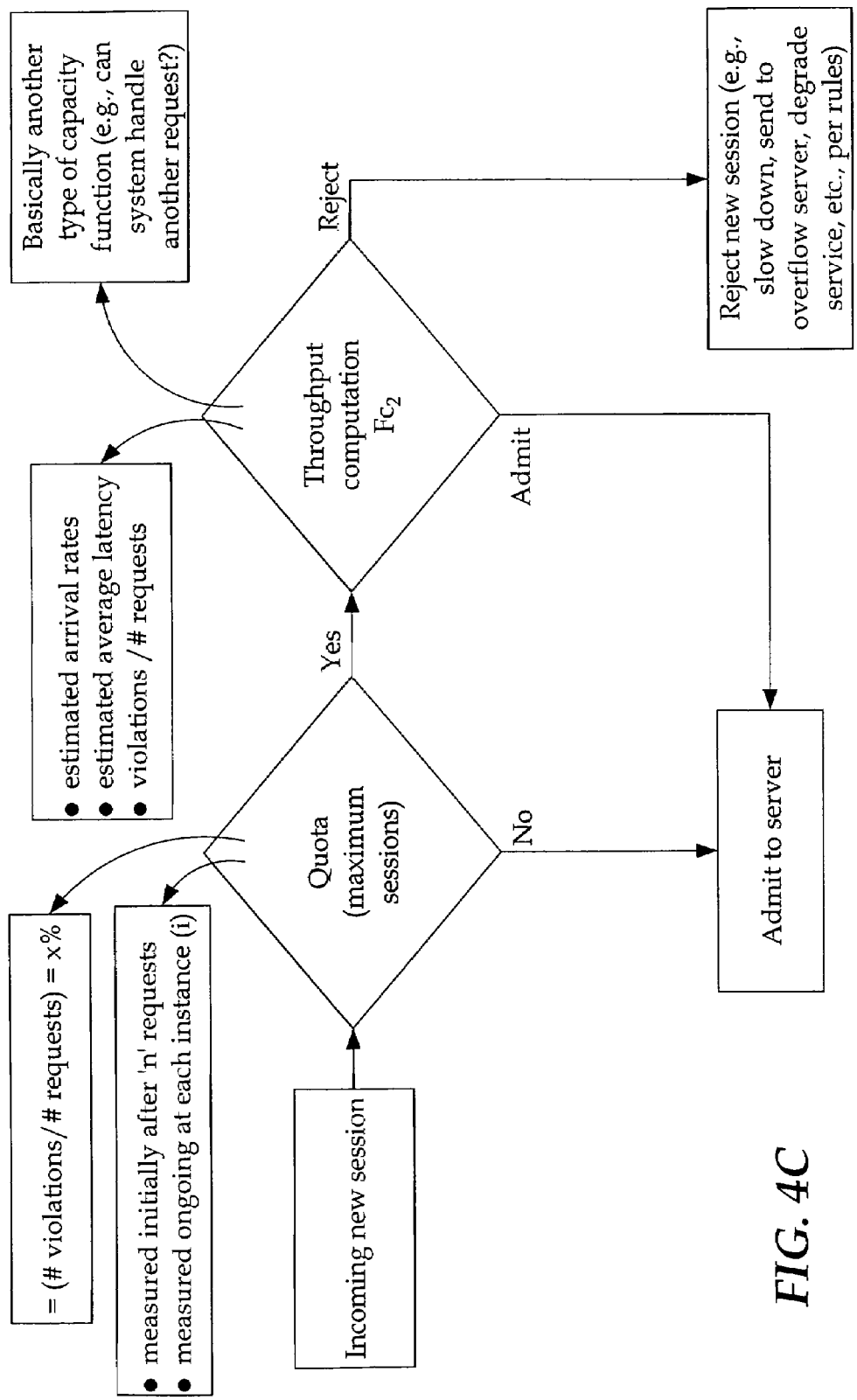
FIG. 4C is a flow chart illustrating a reactive methodology for admitting new content requests to an information system according to one embodiment of the present invention.

Referring now to FIG. 4C, an example of a reactive method for producing pre-determined estimates of the volume and mix of content requests that the information system can process, without compromising the user's quality of service objectives, is illustrated. In this embodiment, a quota of maximum sessions that a server can handle while still maintaining the user's quality of service objectives is calculated. The quota calculation can be achieved by observing a fixed number of content requests and also be determined by the number of times the user's quality of service objectives have been violated divided by the number of content requests.

A determination is then made to see if the content request exceeds the quota. The content request is sent to the server if the quota is not exceeded. If the quota is exceeded, and the user's quality of service objectives are met, the content request is sent to a throughput computation to determine whether or not the server can process any more content requests. If the quota is exceeded, and the user's quality of service objectives are not met, the content request is rejected, redirected or delayed. When the quota is exceeded, and the user's quality of service objectives are not met, then the user's quality of service objectives can be downgraded.

The content request is then sent to the throughput fuction whether or not the server can process any more content requests.

Figure 4D:
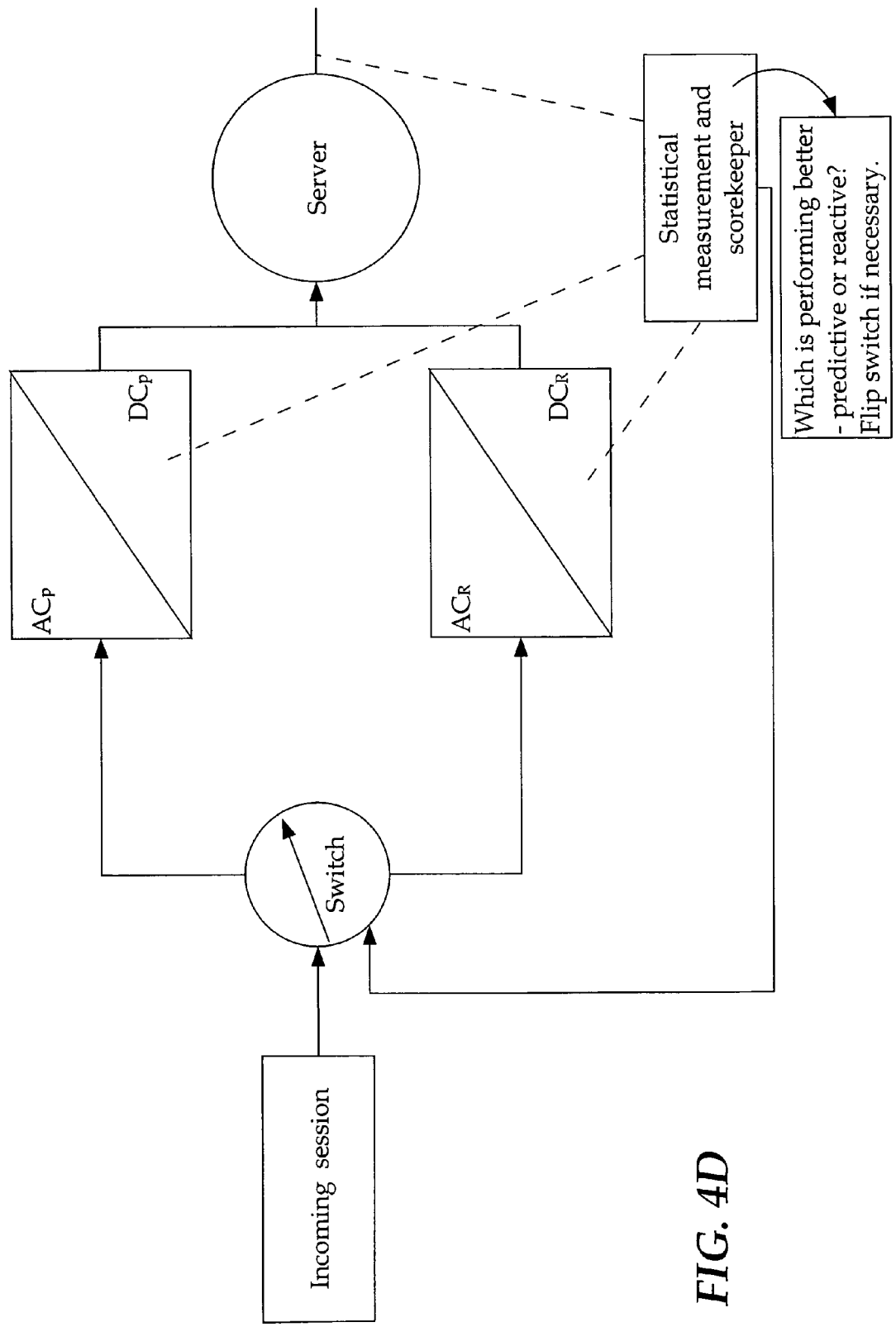
FIG. 4D is a flow chart illustrating a process for determining which of a predictive or reactive methodology for admitting new content requests to an information system according to one embodiment of the present invention.

The throughput calculation may be a capacity utilization of the server using content request arrival rates. Additionally, the throughput calculation may be latencies and a quota of maximum content requests that the server can handle while still maintaining the user's quality of service objectives. Referring now to FIG. 4D, a control method for admitting a content request to an information system includes determining if a predictive or a reactive control method provides a better fit to the user's quality of service objectives. After this determination is made, the result is dispatched and sent to a web-server. Additionally, on-going statistical results of the predictive and reactive functions may be maintained to determine if the predictive or reactive method is better at any instant in time or over a historical period of time. Dynamic switching, via real time feedback to the information system, is made between the predictive or reactive methods based on which one is better at meeting the user quality of service objectives.

Figure 5B:
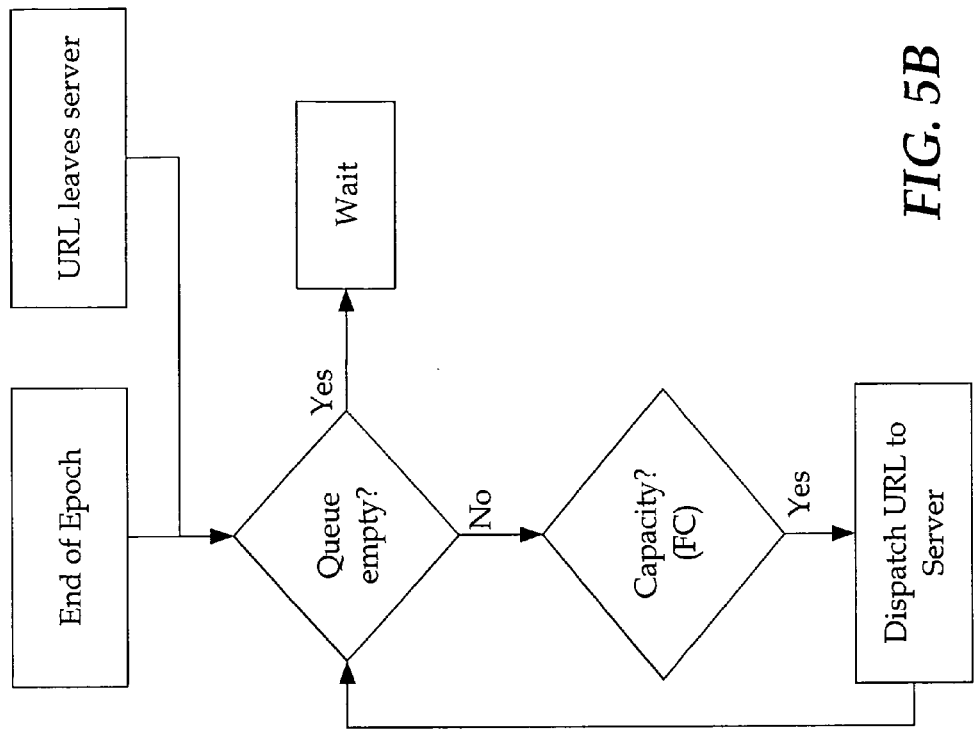
FIGS. 5A and 5B are flow charts that illustrate process for dispatching content requests to a capacity function and a server according to one embodiment of the present invention.
Figure 5A:
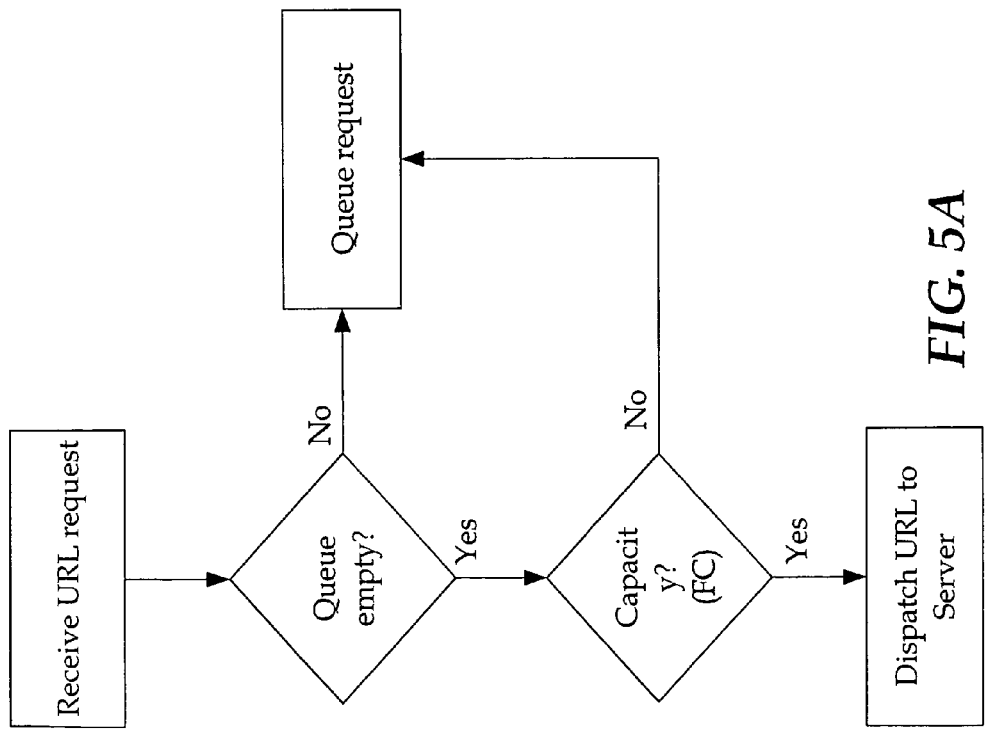

It will be appreciated that the present invention is not limited to the preceding specific examples of predictive and reactive control methods. As illustrated in FIGS. 5A and 5B, the present invention also provides a method for admitting content requests to an information system that includes a server and a queue of content requests coupled to the server. A determination is made to ascertain if the queue is empty. The capacity function of the server is checked to see if the server has the capacity to admit the new content request. When the server has capacity, and the queue is empty, the new content request is dispatched to the server.

Additionally, the throughput capacity function of the server is checked to determine if the server can admit the new content request. When the server has the throughput capacity, the new content request is dispatched to the server.

In one embodiment, when the queue is empty and the server has the capacity to receive new content requests, the new content request is then dispatched to the server. In the event the server does not have capacity, the new content request remains in the queue. Thereafter, the server's capacity is periodically checked. Alternatively, the server is checked for capacity whenever a content request is completed and leaves the server.

In one embodiment, the new content request is only admitted to the queue when it is empty. Then, the server is checked for capacity when a content request is completed and leaves the server.

In one embodiment, when a content request is completed and leaves the server, the queue is checked to determine whether the queue is empty. If the queue is not empty, then the capacity of the server is checked. If the server has capacity then the new content request is admitted to the server. If the server doesn't have capacity the new content request remains in the queue.

Figure 6:
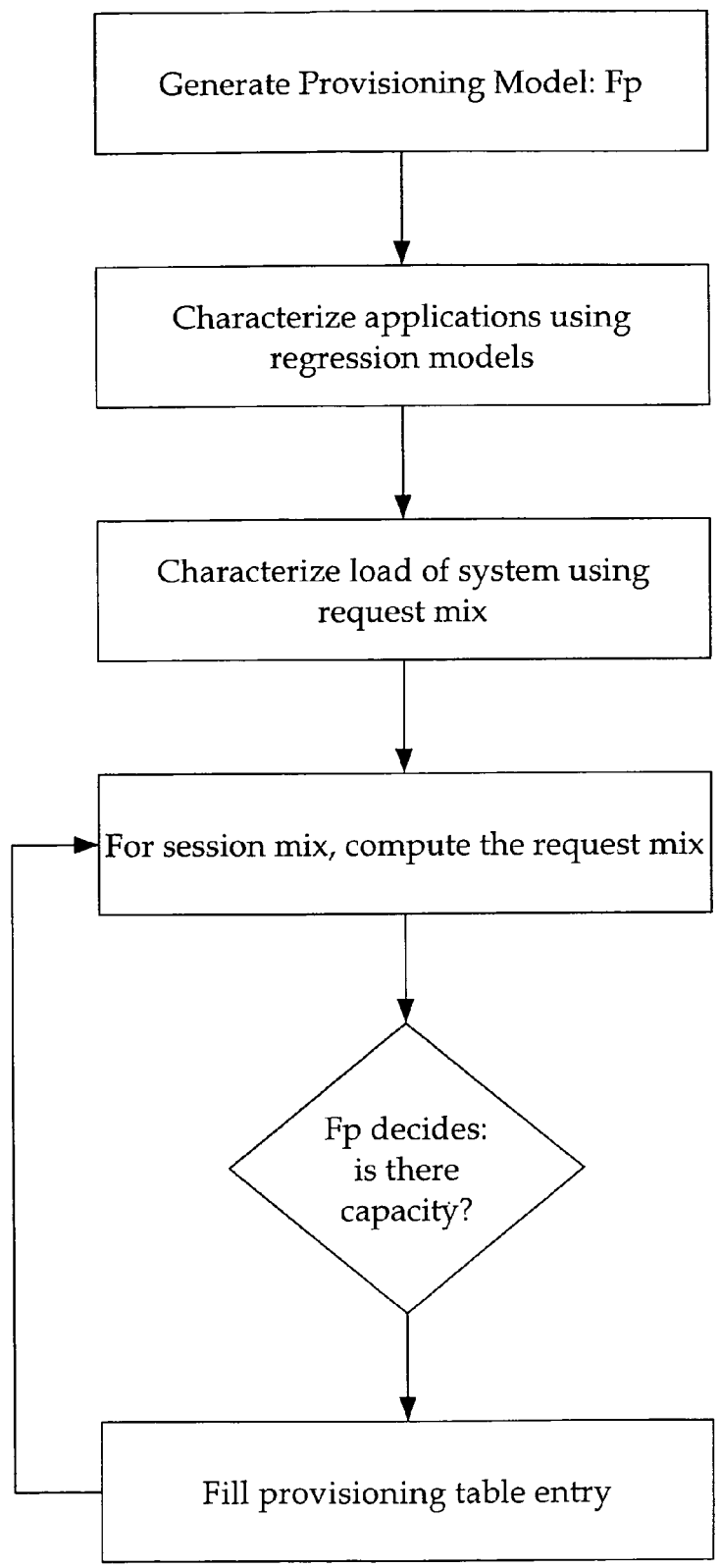
FIG. 6 is a flow chart illustrating a process for provisioning an information system according to one embodiment of the present invention.

In one embodiment, new content requests are dispatched to the information system. The queue may be periodically checked, regardless of whether or not a content request is admitted to or leaves the server. Referring now to FIG. 6, a provisioning model is created. The provisioning model prepares the capacity and behavior of the information system to accommodate and to meet the user's quality of service objectives.

A software application is characterized based on its impact on the capacity of the information system. Additionally, utilization of the capacity of the information system is characterized for software applications, software or hardware revisions and changes, different traffic volumes, mixes and content requests.

A prediction of aggregated incoming and exiting sessions of the information system is received. A model is then produced that correlates a number of sessions to the capacity utilization. Each session is broken down into individual content requests. The model is then applied to individual content requests to determine if the information system has sufficient capacity to process the aggregated content requests while meeting the user's quality of service objectives.

Figure 7:
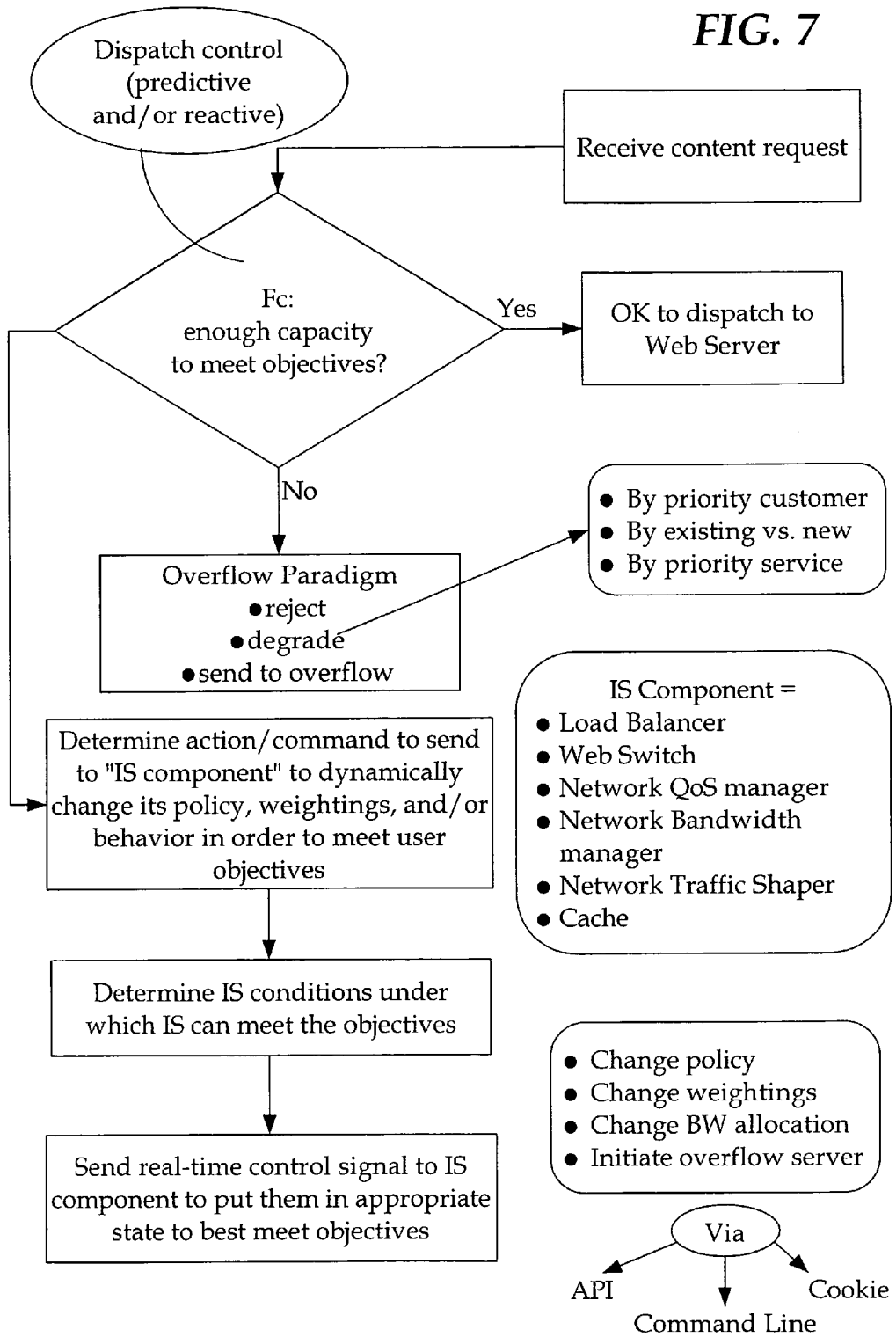
FIG. 7 is a flow chart illustrating a process for dynamically controlling components of an information system according to one embodiment of the present invention.

Referring now to FIG. 7, the present invention can also dynamically control the information system in order to enforce the user's quality of service objectives. In this embodiment, a capacity function is checked to see if the information system has sufficient capacity to process an incoming content request in compliance with the user's quality of service objectives. If the information system does not have sufficient capacity at that instant, then a real time control signal may be sent to a component within the information system. The real time control signal changes the component's policy, weighting or behavior in a manner to better meet the user's quality of service objectives. The components may include, but are not limited to, a webserver, application server, data base server, fire wall server, secure transaction server, load balancer, web switch, network quality of service manager, network bandwidth manager, network traffic shaper, cache, content delivery system, and the like. For purposes of this specification, a real time control signal may be a change in a traffic allocation rule, a change of a traffic allocation weighting of the information system components, a change of bandwidth allocation weighting of the information system components, an initiation of server overflow resources, and the like. The real time control signals are sent to the information system by a variety of means including, but not limited to, a command line interface, an application program interface, one or more cookies, and the like. If the queue is not empty, then the capacity of the server is checked. When the server doesn't have capacity the new content remains in the queue. A determination is then made of actions and commands to send to the information system components. These actions and commands place the information system components in a more readily suitable state for meeting the user's service of quality objectives. Additionally, conditions are determined for when the information system components can meet the user's quality of service objectives. At least one real time control signal is sent to the information system components in response to determining the conditions in which the information system components can meet the user's quality of service objectives. The information system components are subsequently placed in a state to meet the user's quality of service objectives. The behavior of the information system components is modified in order to change the capacity allocation of the server.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   receiving quality of service objectives of one or more users;
   as an information system processes requests for web content from a set of users that includes the one or more users, determining the behavior of the information system;
   detecting changes in the information system that affect the ability of the information system to meet the quality of service objectives, wherein detecting changes in the information system includes detecting software revisions or software changes; and
   in response to detecting the changes, updating the behavior of the information system to increase the ability of the information system to meet the quality of service objectives.

2. The method of claim 1, wherein the behavior is dynamically updated.

3. The method of claim 1, wherein the behavior of the information system includes at least one of an amount of time required or an amount of capacity required for the information system to process one or more requests for web content.

4. The method of claim 1, further comprising prioritizing a capacity allocation of the information system.

5. The method of claim 1, wherein determining the behavior includes determining the behavior as the information system processes requests for load conditions.

6. The method of claim 1, wherein the quality of service objectives include speed of content delivery for a specified time.

7. The method of claim 1, wherein the quality of service objectives include consistency of speed of content delivery.

8. The method of claim 1, wherein the quality of service objectives include a function of a number of concurrent users.

9. The method of claim 1, wherein the quality of service objectives include system response time.

10. The method of claim 1, wherein the quality of service objectives include system response time consistency.

11. The method of claim 1, wherein the information system changes in response to a change in traffic volume.

12. The method of claim 1, wherein the information system changes in response to a change in traffic mix or traffic requests.

13. The method of claim 12, wherein the change in traffic mix includes changes in content requests, geography or user types.

14. The method of claim 1, wherein the information system resides in one or more geographic locations.

15. The method of claim 1, wherein the information system comprises at least one software application and a network information delivery system.

16. The method of claim 15, wherein the software application and network information delivery system reside in one or more geographic locations.

17. The method of claim 1, wherein the information system comprises at least one software application.

18. The method of claim 1, wherein the information system comprises a network information delivery system.

19. The method of claim 18, wherein the network information delivery system includes server and network components.

20. The method of claim 19, wherein the behavior changes in response to changes in the server and network components.

21. The method of claim 18, wherein the network information delivery system application resides in one or more geographic locations.

22. The method of claim 18, wherein changes to the network information delivery system includes addition or deletion of server and network components.

23. The method of claim 1, wherein detecting changes results in a determination of control techniques required by the information system to ensure that the quality of service objectives are met.

24. The method of claim 1, wherein detecting changes includes determining the amount of capacity that needs to be reserved in the information system to ensure that the quality of service objectives are met.

25. The method of claim 1, wherein detecting chances includes updating behavior characteristics of the information system based on recent observations of the information system.

26. The method of claim 1, wherein detecting changes includes updating behavior characteristics of the information system based on recent and historical observations of the information system.

27. The method of claim 1, wherein:
the information system comprises at least one software application and a network information delivery system;
determining the behavior of the information system includes determining the behavior of the software application and determining the behavior of the network information delivery system;
updating the behavior of the information system includes dynamically updating the behaviors of the software application and the network information delivery system; and
the method further comprises prioritizing the capacity allocation of the network information delivery system.

28. A machine-readable storage medium storing one or more sequences of instructions which, when executed by one or more processors, causes the one or more processors to perform the method recited in claim 1.

29. A machine-readable storage medium storing one or more sequences of instructions which, when executed by one or more processors, causes the one or more processors to perform the method recited in claim 2.

30. A machine-readable storage medium storing one or more sequences of instructions which, when executed by one or more processors, causes the one or more processors to perform the method recited in claim 3.

31. A machine-readable storage medium storing one or more sequences of instructions which, when executed by one or more processors, causes the one or more processors to perform the method recited in claim 4.

32. A machine-readable storage medium storing one or more sequences of instructions which, when executed by one or more processors, causes the one or more processors to perform the method recited in claim 5.

33. A machine-readable storage medium storing one or more sequences of instructions which, when executed by one or more processors, causes the one or more processors to perform the method recited in claim 6.

34. A machine-readable storage medium storing one or more sequences of instructions which, when executed by one or more processors, causes the one or more processors to perform the method recited in claim 7.

35. A machine-readable storage medium storing one or more sequences of instructions which, when executed by one or more processors, causes the one or more processors to perform the method recited in claim 8.

36. A machine-readable storage medium storing one or more sequences of instructions which, when executed by one or more processors, causes the one or more processors to perform the method recited in claim 9.

37. A machine-readable storage medium storing one or more sequences of instructions which, when executed by one or more processors, causes the one or more processors to perform the method recited in claim 10.

38. A machine-readable storage medium storing one or more sequences of instructions which, when executed by one or more processors, causes the one or more processors to perform the method recited in claim 11.

39. A machine-readable storage medium storing one or more sequences of instructions which, when executed by one or more processors, causes the one or more processors to perform the method recited in claim 12.

40. A machine-readable storage medium storing one or more sequences of instructions which, when executed by one or more processors, causes the one or more processors to perform the method recited in claim 13.

41. A machine-readable storage medium storing one or more sequences of instructions which, when executed by one or more processors, causes the one or more processors to perform the method recited in claim 14.

42. A machine-readable storage medium storing one or more sequences of instructions which, when executed by one or more processors, causes the one or more processors to perform the method recited in claim 15.

43. A machine-readable storage medium storing one or more sequences of instructions which, when executed by one or more processors, causes the one or more processors to perform the method recited in claim 16.

44. A machine-readable storage medium storing one or more sequences of instructions which, when executed by one or more processors, causes the one or more processors to perform the method recited in claim 17.

45. A machine-readable storage medium storing one or more sequences of instructions which, when executed by one or more processors, causes the one or more processors to perform the method recited in claim 18.

46. A machine-readable storage medium storing one or more sequences of instructions which, when executed by one or more processors, causes the one or more processors to perform the method recited in claim 19.

47. A machine-readable storage medium storing one or more sequences of instructions which, when executed by one or more processors, causes the one or more processors to perform the method recited in claim 20.

48. A machine-readable storage medium storing one or more sequences of instructions which, when executed by one or more processors, causes the one or more processors to perform the method recited in claim 21.

49. A machine-readable storage medium storing one or more sequences of instructions which, when executed by one or more processors, causes the one or more processors to perform the method recited in claim 22.

50. A machine-readable storage medium storing one or more sequences of instructions which, when executed by one or more processors, causes the one or more processors to perform the method recited in claim 23.

51. A machine-readable storage medium storing one or more sequences of instructions which, when executed by one or more processors, causes the one or more processors to perform the method recited in claim 24.

52. A machine-readable storage medium storing one or more sequences of instructions which, when executed by one or more processors, causes the one or more processors to perform the method recited in claim 25.

53. A machine-readable storage medium storing one or more sequences of instructions which, when executed by one or more processors, causes the one or more processors to perform the method recited in claim 26.

54. A machine-readable storage medium storing one or more sequences of instructions which, when executed by one or more processors, causes the one or more processors to perform the method recited in claim 27.

* * * * *

UNITED STATES PATENT AND TRADEMARK OFFICE
CERTIFICATE OF CORRECTION

PATENT NO. : 7,370,108 B1 Page 1 of 1
APPLICATION NO. : 11/527101
DATED : May 6, 2008
INVENTOR(S) : Moises Goldszmidt et al.

It is certified that error appears in the above-identified patent and that said Letters Patent is hereby corrected as shown below:

Title page, item
(75) Inventors: After Moises Goldzsmidt, delete "Foster City" and insert --Moss Beach--.

Title page, item
(63) Related U.S. Application Data, 17th line, after 09/615,678, filed on, delete "Jul. 17" and insert --Jul. 14--.

Signed and Sealed this

Eighth Day of July, 2008

JON W. DUDAS
*Director of the United States Patent and Trademark Office*